March 11, 1969  R. D. HIPP, JR  3,431,967
TWO-PIECE MOLD FOR MOLDING AN UNDERCUT
RIM, AND METHOD OF MOLDING
Filed Aug. 12, 1964
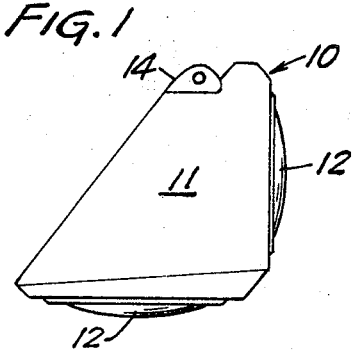
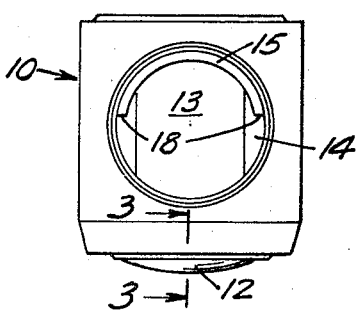
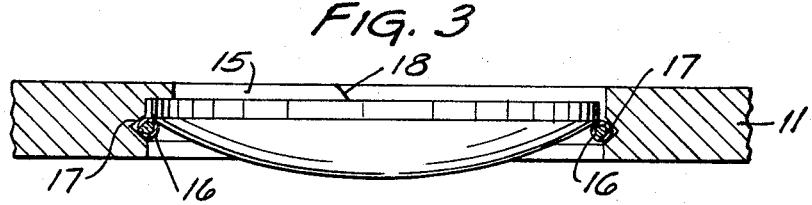
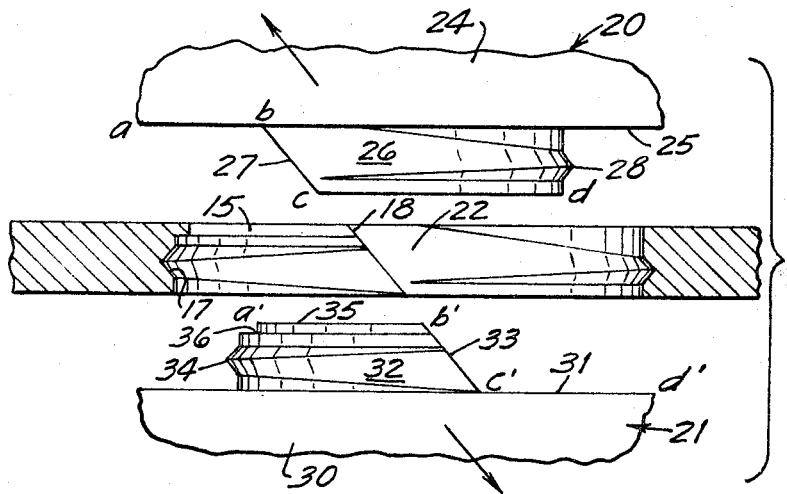
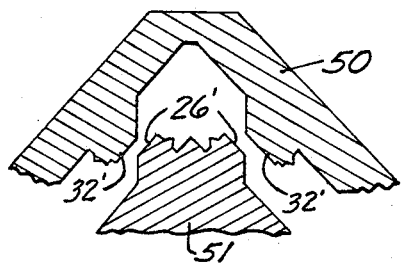
INVENTOR.
RICHARD D. HIPP, JR.
BY
Carpenter, Abbott, Coulter & Kinney
ATTORNEYS

United States Patent Office 3,431,967
Patented Mar. 11, 1969

3,431,967
TWO-PIECE MOLD FOR MOLDING AN UNDERCUT RIM, AND METHOD OF MOLDING
Richard D. Hipp, Jr., Circle Pines, Minn., assignor to Minnesota Mining and Manufacturing Company, St. Paul, Minn., a corporation of Delaware
Filed Aug. 12, 1964, Ser. No. 389,160
U.S. Cl. 164—6                            10 Claims
Int. Cl. B22c *9/22;* B22d *33/04;* B29d *12/00*

ABSTRACT OF THE DISCLOSURE

Undercut frame-like castings, e.g. lens holders, are produced in simple two-piece single-draw injection molds, the two halves of the mold being assembled and dis-assembled along a plane at an acute angle to the plane of the frame.

---

This invention relates to lens holders and to methods of making the same. In one important aspect the invention relates to simplified methods and apparatus for the economical production of lens holders by injection molding techniques.

The invention has been found to have particular utility in the manufacture of projection heads for overhead projectors.

A form of projection head which has received widespread commercial acceptance consists essentially of a generally right triangularly cross-sectioned metal housing having a plane mirror along the hypotenuse and a single lens at each of the other two sides. Prior to the present invention the lens mount rims were typically machined from the cast housing, in order to provide the required lens-supporting ledges and the grooves for the retaining rings. The machining process was both time-consuming and expensive.

It has now been found possible to form a fully effective grooved lens support structure by simple injection molding procedures employing a split die. The molded support or rim is adequately grooved to permit permanent rigid retention of an inserted lens by means of a conventional expansion ring seal. Close tolerances and full rigidity of housing structure are obtained. Machining is eliminated.

These and other advantages are obtained, in accordance with the invention, by restricting the lens-supporting ledge of the frame member to slightly less than one-half the perimeter of the lens opening and by appropriately shaping the remaining interior surface of the rim to permit withdrawal of the two opposing mold sections at an acute angle with the plane of the frame or rim.

The invention will now be more fully explained and described by reference to the accompanying drawing, in which:

FIGURE 1 is a side elevation of a typical projection head for an overhead projector;

FIGURE 2 is a front elevation of the head of FIGURE 1 with the upper lens removed;

FIGURE 3 is a central cross-section of the lower lens and lens mount portion of the device of FIGURE 2 taken along line 3—3;

FIGURE 4 is an exploded partial cross-sectional representation of a two-piece mold assembly and lens mount formed therein; and FIGURE 5 is a partial representation in cross-section of a mold assembly for use in molding the housing of the projection head of FIGURES 1 and 2.

The projection head 10 comprises a generally right-triangular housing 11, having circular lens-mount openings in the two side faces fitted with convex-concave lenses 12, and interiorly provided with a plane mirror 13 supported on a removable back member 14 forming the hypotenuse.

The lens 12 in each instance is supported against a narrow inner ledge 15 encircling slightly less than one-half the circumference of the lens-mount opening. The lens is held against the ledge and in place within the opening by split ring expansion seal member 16 which fits within a peripheral groove 17. The ends 18 of the ledge 15 are slanted outwardly at the same acute angle to the plane of the ledge as are the corresponding sides of the groove 17.

A two-piece mold consisting of a top half 20 and a bottom half 21, portions of which are represented in FIGURE 4, is used in casting the housing 11. The two meet along the plane represented by line *a, b, c, d* of piece 20 and *a', b', c', d'* of piece 21. After the housing has been cast, the mold sections are separated from each other and from the casting in the direction indicated by the arrows, which will be seen to be parallel to the slant ends 18 of the ledge 15 and to the corresponding sides of the grooves 17 so that there is no obstruction to the separation at any point of the circumference of the lens holder.

In order to achieve the result just described it is necessary that the depth of the groove 17 be uniformly tapered to a flattened inner rim surface at the area 22 just beyond the ends 18 of the ledge 15 and at each side of the rim. At these areas the retaining ring 16 presses against the rim surface without being wedged toward the lens 12.

The split ring 16 consists of a curved length of spring steel piano wire coated with a resiliently conformable plastic sheath, and is snapped in place within the groove 17 and against the lens 12 under compression, with the adjoining ends preferably in line with the approximate center of the ledge 15. The lens is held firmly in place against the ledge by the ring. The plastic sheath conforms to the rim of the lens holder and to the glass surface of the lens to provide an essentially dust-tight seal, even though the lens itself may not contact the retaining rim other than at the surface of the supporting ledge 15.

The top mold member 20 will be seen to comprise a segment 24 having a flat surface 25 carrying a generally semicylindrical raised boss 26 having a diametrical slant face 27 and provided with a ridge 28 tapering from maximum height opposite the slant face to zero height adjacent the ends of the slant face. Similarly, the bottom mold member 21 comprises a segment 30 having a flat surface 31 carrying a semicylindrical raised boss 32 having a diametrical slant face 33 and provided with a ridge 34 tapering from maximum height opposite the slant face to zero height adjacent the ends thereof. In addition the flat outer face 35 of the boss 32 is cut away along the arcuate edge to form a step groove 36 within which the lens-supporting ledge 15 is to be formed.

For simplicity the description of the mold and lens holder has been given in terms of a single holder or rim section. In forming the housing 11 of the projection head 10 it will be apparent that the two rim sections may be formed simultaneously. Thus it has been found expedient, as indicated in FIGURE 5, to employ a hollow outer mold section 50 of generally V-shaped cross-section carrying two projecting semicylindrical bosses 32', and a matching inner mold section 51 of generally wedge-shaped cross-section carrying two projecting bosses 26', in making the housing 11. The ease of assembly and disassembly of the mold is particularly apparent from consideration of this modification.

It will be appreciated that the remainder of the mold is of conventional design permitting the injection under pressure of plastic metal or other molding material and the subsequent cooling or hardening of the molded article. Zinc die casting alloy identified as "SAE 903" has been found acceptable for housings as illustrated in FIGURE 1 and having over-all dimensions of approximately 4½" x 4½" x 4", with lens opening designed for lenses of about 3½" diameter.

There has thus been provided a simplified mold structure and molding technique whereby lens mounts and other structures requiring peripheral retaining grooves may be produced rapidly and economically by simple die casting and without subsequent machining, by employing molds constructed of two members slidably separable from each other, and from the molded piece formed therebetween, by movement along a line at an acute angle to said piece and parallel to an edge of the retaining groove.

What is claimed is as follows:

1. A two-part mold for the casting of an internally grooved rigid rim structure comprising: a first member (20) having a flat surface (25) carrying a semicylindrical projection (26) having a diametrical slant face (27) and a ridge (28) passing around the arcuate surface and tapering from maximum height opposite the center of the slant face to zero height adjacent the ends of the slant face, said ridge having two flat faces, one of said faces forming an angle with the flat surface of said first member which is the same as the angle of said slant face therewith; and a second member (21) having a cooperating flat surface (31) and semicylindrical projection (32), said projection having a diametrical slant face (33) and a ridge (34) passing around the arcuate surface and tapering from maximum height opposite the center of the slant face to zero height adjacent the ends of the slant face, said ridge having two flat faces, one of said faces forming an angle with the flat surface of said second member which is the same as the angle of said slant face therewith, and said projection being recessed with a narrow recess (36) around the arcuate edge; said first and second members fitting together to provide an annular mold cavity, said members being separable from a rim member cast therebetween by movement along the common plane of said slant faces.

2. A two-part simple straight pull mold useful in the injection molding of rigid internally grooved or undercut rim or frame structures and consisting essentially of two mold members (20, 21) each having a flat surface (25, 31) and a core segment (26, 32) projecting therefrom, each said core segment having a flat outer face and having a slant edge (27, 33) forming an obtuse angle with said face, and being adapted to fit against the flat surface and the slant edge respectively of the opposing mold member to define a cored mold, each said core segment additionally having a ridge (28, 34) along at least a portion of its edge opposite its slant edge, said ridge being defined by two intersecting surfaces, one of said surfaces and said slant edge having substantially the same inclination with respect to said flat surface.

3. The mold of claim 2 wherein the two core segments are each generally semicylindrical and cooperate to provide a generally cylindrical core in said mold.

4. The mold of claim 3 wherein the said ridge tapers from maximum height opposite said slant edge to zero height adjacent the ends thereof.

5. The mold of claim 4 wherein one of said core segments is recessed along its semicylindrical outer edge.

6. A two-part mold as defined in claim 5 and useful in the casting of rigid projection head housings having two circular lens-receiving openings surrounded by rim structures at approximately right angles to each other, said mold including a force member (51) having two identical said flat surfaces at approximately right angles to each other and each having a said core segment (26') projecting therefrom, and a cavity member (50) having two identical said flat surfaces at approximately right angles to each other and each having an edge-recessed said core segment (32') projecting therefrom.

7. The method of making a rigid casting in the form of an internally grooved or undercut frame comprising (1) preparing a mold consisting essentially of two mold members each having a flat surface and a core segment projecting therefrom, each said core segment having a flat outer face and a slant edge forming an obtuse angle with said face and being in close-fitting position against the flat surface and the slant edge of the opposing mold member to define a cored mold, each said core segment additionally having a ridge along at least a portion of its edge opposite its slant edge, one face of said ridge being at substantially the same inclination to said flat surface as is said slant face; (2) filling said cored mold with casting material in plastic form and permitting said material to rigidify; and (3) separating said mold members from each other and from the rigid casting by movement along the common plane of said slant faces.

8. The method of claim 7 wherein said core segments are each generally semicylindrical to provide a generally cylindrical core, said slant edges lying diametrically of said core, said ridge tapering from maximum height opposite said slant edge to zero height adjacent the ends thereof, and the semicylindrical outer edge of one of said segments being recessed.

9. The method of making a two-part mold suitable for use in the casting of rigid internally grooved or undercut rim or frame structures comprising constructing each of the two parts of said mold to include a flat surface and a core segment projecting therefrom and having a flat outer face, a slant edge forming an obtuse angle with said outer face, and a ridge along at least a portion of the edge opposite said slant face, one face of said ridge being at substantially the same inclination to said flat surface as is said slant edge, the two said core segments fitting together at said slant edges to provide a core, and the flat face of each said segment fitting against the flat surface of the other of said two mold parts; and then assembling said two parts into a mold by movement toward each other along the common plane of said slant faces.

10. The method of claim 9 wherein an edge recess is provided around the outer edge and connecting the ends of the slant edge of one of said core segments.

References Cited

UNITED STATES PATENTS

| 2,366,475 | 1/1945 | Bartholomew | 22—149 |
| 2,781,548 | 2/1957 | Morin | 18—42 |
| 2,891,283 | 6/1959 | Cramer | 18—42 |
| 2,894,287 | 7/1959 | Zeigle | 18—42 |
| 1,546,824 | 12/1924 | Buckles et al. | 249—63 |
| 3,182,218 | 5/1965 | Videtic | 18—45 |

FOREIGN PATENTS

| 963,056 | 7/1964 | Great Britain. |

JULIUS FROME, *Primary Examiner.*

A. H. KOECKERT, *Assistant Examiner.*

U.S. Cl. X.R.

18—45; 164—137; 249—57, 184; 264—318